US005732384A

United States Patent [19]

Ellert et al.

[11] Patent Number: 5,732,384

[45] Date of Patent: Mar. 24, 1998

[54] GRAPHICAL USER INTERFACE FOR AIR TRAFFIC CONTROL FLIGHT DATA MANAGEMENT

[75] Inventors: James W. Ellert, Placentia; Patricia R. Etter, El Segundo, both of Calif.

[73] Assignee: Hughes Aircraft, Los Angeles, Calif.

[21] Appl. No.: 525,889

[22] Filed: Sep. 8, 1995

[51] Int. Cl.[6] .......................... G06F 19/00; G06F 163/00; G01S 13/91

[52] U.S. Cl. .......................................... 701/120; 395/353

[58] Field of Search .......................... 364/439; 395/347, 395/353, 354

[56] References Cited

U.S. PATENT DOCUMENTS

| | | | |
|---|---|---|---|
| 3,900,846 | 8/1975 | Gibbon et al. | 343/6 R |
| 4,706,198 | 11/1987 | Thurman | 364/439 |
| 5,119,476 | 6/1992 | Texier | 395/157 |
| 5,181,027 | 1/1993 | Shafer | 340/961 |
| 5,265,023 | 11/1993 | Sokkappa | 364/439 |
| 5,345,550 | 9/1994 | Bloomfield | 395/156 |
| 5,428,733 | 6/1995 | Carr | 395/159 |
| 5,448,768 | 9/1995 | Zinser | 455/108 |
| 5,554,990 | 9/1996 | McKinney | 342/36 |
| 5,659,475 | 8/1997 | Brown | 364/439 |

FOREIGN PATENT DOCUMENTS 2232316 12/1990 United Kingdom .

*Primary Examiner*—Michael Zanelli

*Attorney, Agent, or Firm*—G. S. Grunebach; M. W. Sales; W. K. Denson-Low

[57] ABSTRACT

A method for interactively displaying flight information in an air traffic control system. Flight information lists are displayed relative to associated geographic fixes, and further flight information is displayed pursuant to user selection of an item on a flight list.

10 Claims, 6 Drawing Sheets

GRAPHICAL USER INTERFACE FOR AIR TRAFFIC CONTROL FLIGHT DATA MANAGEMENT

BACKGROUND OF THE INVENTION

The disclosed invention is directed generally to air traffic control systems, and more particularly to an interactive air traffic control graphical user interface.

In order to promote safe and efficient use of air transportation, an air traffic control system comprised of air traffic control facilities tracks and manages flights in navigable airspace which is generally divided into control areas which in turn may be further divided into sectors. Each control area has an associated air traffic control facility which is responsible for the air traffic in the control area. Each air traffic control facility is staffed by a plurality of air traffic controllers having responsibility for respective sectors of the control area. As a flight passes from one control area to another, responsibility for the flight is handed off from one air traffic control facility to another, and as a flight passes from one sector to another within a control area, responsibility for the flight is handed off from one sector to another. Effectively, as a flight progresses from a departure airport to an arrival airport, responsibility for the flight is handed off from one air traffic controller to another.

An air traffic controller plans and manages a flight of an aircraft by use of a radar map display that depicts the position of the aircraft in a given airspace area and a printed flight strip that contains information regarding the flight. The information contained in a printed flight strip is based on a flight plan which is filed with an air traffic control facility by a pilot or an airline to define a planned flight. A flight plan identifies the type of aircraft, the aircraft identification number, the planned destination, the planned route, the planned airspeed, as well as other information regarding the flight that would be useful in tracking and managing the flight. As a flight progresses, its flight plan may be amended.

Flight strips for a sector are placed in suitable holders adjacent the radar display, and are generally organized by posting fixes which are geographical fixes within a sector. Typically, air routes are comprised of segments between predetermined geographical fixes which are defined by electronic navigation equipment, and it is therefore convenient to visualize flights in terms of locations that they will pass over. A controller's primary responsibility is to maintain separation between aircraft, and as a flight progresses through a sector, the flight strip is utilized to keep track of what actions need to be taken relative to the flight to maintain separation. For example, when a controller identifies a flight on radar, an annotation is entered on the flight strip to indicate radar contact. Similarly, if radar service is terminated, an annotation is entered to indicate termination of radar service. If an altitude change is granted, the new altitude must be written on the flight strip.

Considerations with the use of flight strips include the need to manually place and remove the flight strips from the holders, the need to visualize the association of certain flight strips with a geographic fix on the radar display, the need to look away from the radar display to view and to annotate the flight strips, and the need to store physical strips of paper as records. Other considerations include the inability to automate the data management function for controllers, as well as the current need for redundant entry of data into the system and on the printed flight strips.

SUMMARY OF THE INVENTION

It would therefore be an advantage to provide an air traffic control display that displays co-located flight and surveillance information, allows direct manipulation of such information, summarizes the flight information, and provides quick access to more detailed flight information.

Another advantage would be to provide an air traffic control display that interactively displays flight information.

The foregoing and other advantages are provided by the invention in a method that displays lists of flight information and interactively displays further flight information pursuant to user selection of items on a list.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
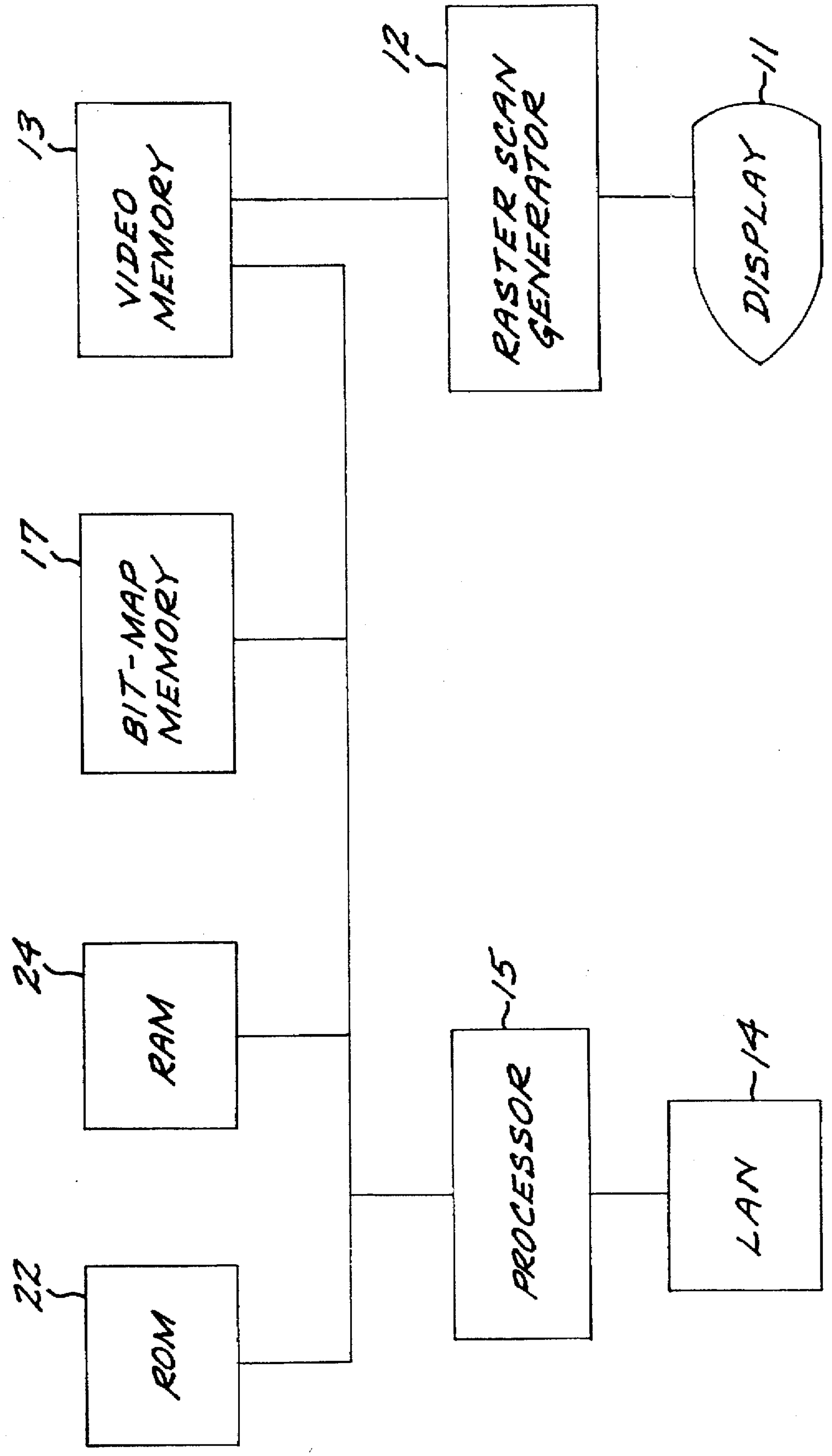
FIG. 1 is a block diagram of an air traffic control display system in which the invention can be implemented.

In the following detailed description and in the several figures of the drawing, like elements are identified with like reference numerals.

The invention is generally directed to an interactive display that displays information which contains records for respective flights. In accordance with conventional interactive display techniques, the displayed information contains displayed items such as pushbuttons, a menu bar, and fields that can be selected, for example by placing a mouse cursor over the item and clicking an appropriate mouse button. When an item is selected, the computer of the interactive display performs an operation associated with the selected item. For example, a flight is "hooked" for further processing by selecting an appropriate displayed item.

Referring now to FIG. 1, set forth therein is a block diagram of an Air Traffic Control (ATC) video display system in which the invention can be implemented. The ATC video display system includes a raster scan generator 12 which converts raster image data stored in a video memory 13 to video signals that are provided to a raster video display 11 that displays a raster image that is representative of the raster image data stored in the video memory 13. In accordance with conventional display techniques, the raster video display 11 produces a visible video raster image that is comprised of an array of uniquely addressable pixels arranged in rows and columns on a screen of the video display. The image is more particularly formed by selective illumination of the pixels such that they are visible relative to background pixels which may be dark or of a predetermined color. The pixel data that defines the attributes of each pixel is stored in a corresponding memory location in the video memory 13. For convenience, the pixel data for a pixel in the raster image is sometimes called a pixel and the particular meaning of the term pixel should be understood from the context in which such term is utilized.

The raster image data contained in the video memory represents an image that is to be displayed by the video display 11, and is "rendered" (i.e., generated) by a processor 15 in accordance with conventional techniques. By way of illustrative example, the processor 15 receives from a local area network (LAN) 14 radar data representative of aircraft information to be displayed, including for example position, identification number, altitude, and velocity. The radar data is processed to render into a bit-map memory 17 raster image data for the image to be displayed. The bit-map memory 17 is of at least the same size as the video memory 13, and the rendered raster image data is then copied to the video memory 13. In accordance with conventional architectures, the display system includes a read-only memory (ROM) 22 and a random access memory (RAM) 24 which are utilized by the processor 15. The processor 15, the bit-map memory 17, the video memory 13, the ROM 22, and the RAM 24 are interconnected by a bus 16.

Figure 2:
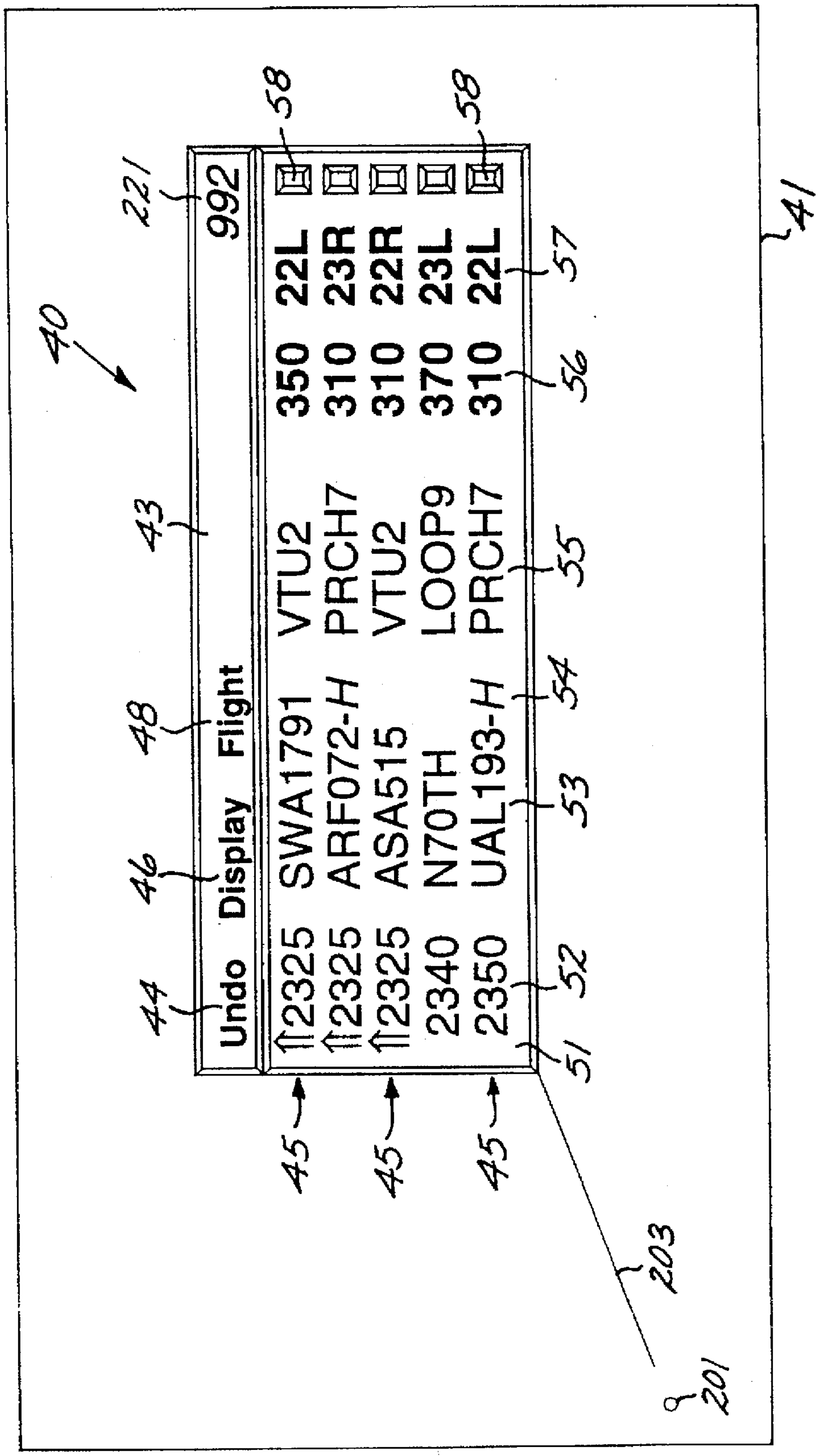
FIG. 2 is a schematic illustration of a departure list that is displayed in accordance with the invention.

Referring now to FIG. 2, schematically set forth therein is a departure list 40 in accordance with the invention which is displayed in a raster image 41 on the video display 11. The departure list includes a menu bar and departure records 45 for a plurality of flights that are departing from an airport assigned to the list. The departure list 40 is displayed in the proximity of a displayed symbol 201 that represents the airport from which the flights in the departure list are departing. A leader line 203 extends from the airport symbol 201 to the departure list 51 for the purpose of visually associating the departure list with the airport. The leader line connects, for example, to the center of the airport symbol at one end and to the nearest corner on the departure list at the other end.

Each departure record includes the following fields:

(1) A Departure Clearance Indicator field 51 in which a departure clearance checkbox □ is displayed pursuant to entry of a departure clearance for the flight identified by the departure record to indicate that a departure clearance has been entered for the flight identified by the departure record and is waiting to be issued. A departure clearance is entered as described further herein by selection of the Expand pushbutton of the departure record. When a departure clearance is issued (i.e., communicated) to a pilot after it has been entered, the controller selects the Departure Clearance indicator field 51 for the corresponding flight, and Departure Clearance indicator ↑ is displayed in place of the departure clearance check box.

(2) An Estimated Time of Departure field 52 which contains the estimated time of departure of the flight identified by the departure record. The estimated time of departure is underlined if a departure clearance has been issued with a void time. If the departure clearance has been issued with a void time, selection of the Estimated Time of Departure field causes the display of the void time in cyan. If the void time expires, the estimated time of departure is displayed in red.

(3) An Aircraft Identification field 53 which contains an alphanumeric identifier or call sign for the flight identified by the departure record. The Aircraft Identification field is selected by the user to identify or "hook" the flight for subsequent operations regarding the departure record or flight plan associated with the flight represented by the departure record.

(4) A Heavy Jet field 54 that displays a heavy jet indicator H when the aircraft associated with the departure record is a heavy jet. The type of aircraft can be displayed for a short time period such as three seconds by user selection of the heavy jet indicator H.

(5) A Departure Route field 55 that identifies the first leg of the departure route to be followed by the flight, or the Standard Instrument Departure that is to be followed by the flight.

(6) An Altitude field 56 which displays an assigned altitude if a departure clearance has been issued. Otherwise, a requested altitude is displayed. The assigned altitude is changed by user selection of the Altitude field.

(7) An Assigned Runway field 57 which displays an assigned runway for departure. The assigned runway is changed by user selection of the Assigned Runway field.

(8) An Expand pushbutton 58. User selection of the Expand pushbutton displays a Full Flight dialog box, an example of which is shown in FIG. 5, which is used to enter a departure clearance and to view the full flight plan for the flight.

The Menu bar 43 includes an Undo pull-down menu 44 which is selected to undo specific operations, a Display pull-down menu 46 which is selected to perform display related functions such as sort by selected information such as cleared state and/or estimated time of departure, and a Flight pull-down menu 48 which causes display of a flight menu containing predetermined options that can be individually selected to display a dialog box for the selected option. In accordance with known graphical user interface techniques, a dialog box provides a general mechanism for a user to enter a system command, and is visible only for the short time while the user interacts with it. A dialog box is caused to "pop up" on the screen as a result of user action, and to "pop down" when the user is finished interacting with it. A dialog box typically includes "OK" and "Cancel" buttons. Examples of dialog boxes include a Hold dialog, a Hold Cancel dialog, a Depart dialog, a Departure Time dialog, a Cancel Dialog, and an Secondary Search Radar (SSR) Code dialog.

Figure 5:
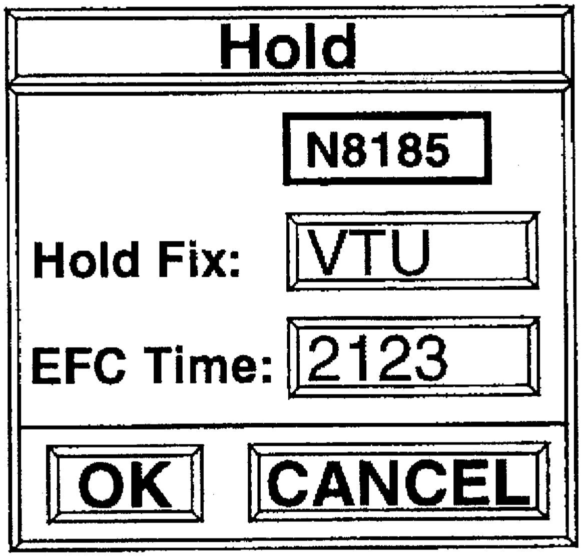
FIG. 5 is a schematic illustration of a hold dialog box that is displayed by appropriate selection of an item from the lists of FIGS. 2, 3 or 4.

By way of illustrative example, FIG. 5 schematically depicts a Hold dialog that contains a display-only Aircraft Identification field, an editable Hold Fix field, an editable Expect Further Clearance (EFC) field, an OK button and a Cancel button. The OK button is selected to commit the change and close the dialog. The Cancel button is selected to close the dialog without committing change.

The Menu bar 43 also includes an altimeter field 221 which displays the current altimeter setting for the airport with which the departure list is associated. User selection of the altimeter field 221 causes a current weather report to be displayed above the departure list, for example in the same manner as illustrated with respect to the arrival list of FIG. 4.

Figure 3:
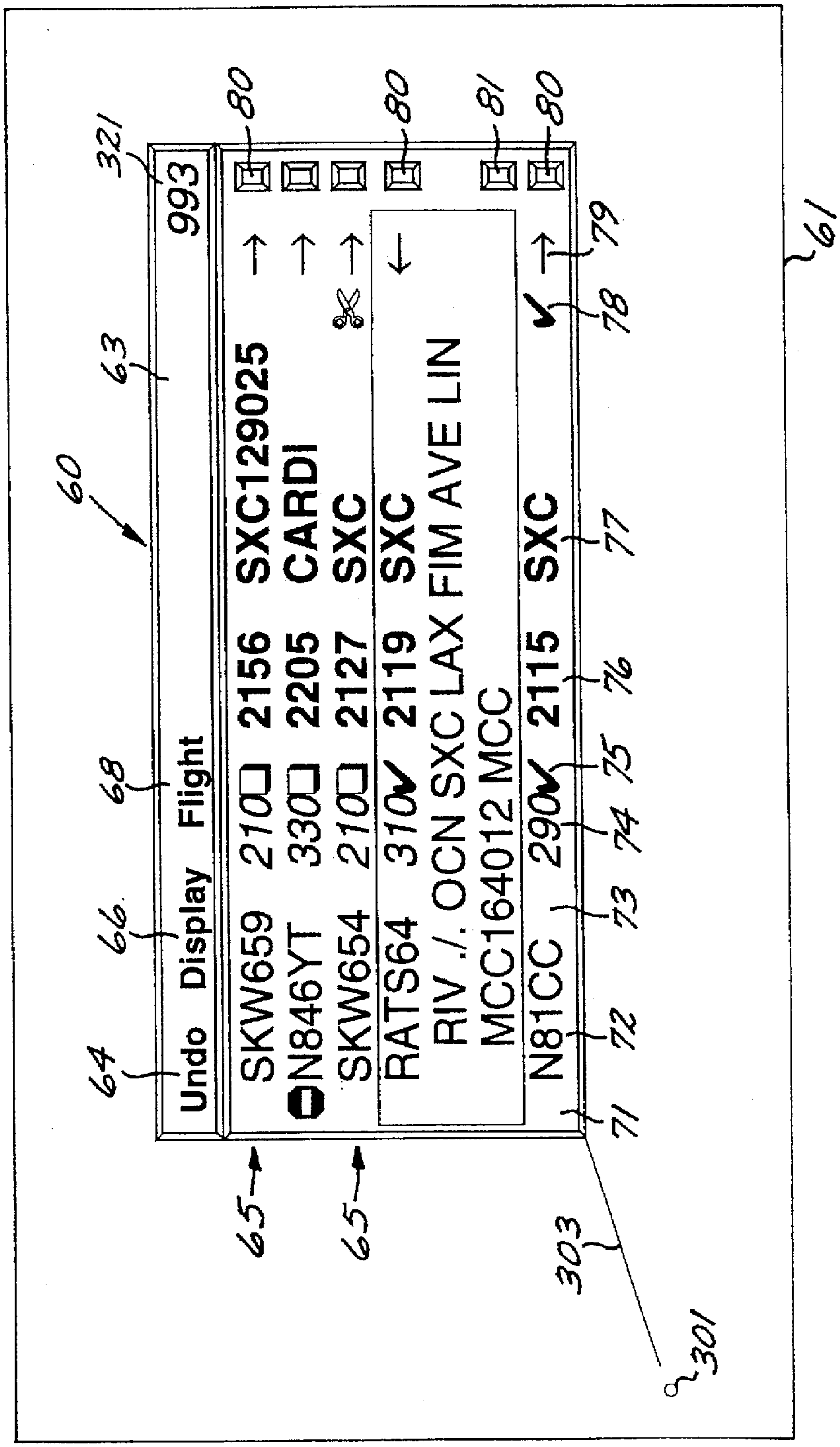
FIG. 3 is a schematic illustration of an enroute list that is displayed in accordance with the invention.

Referring now to FIG. 3, schematically set forth therein is an enroute list 60 in accordance with the invention which is displayed in a raster image 61 on the video display 11. The enroute list 60 includes a menu bar 63 and enroute records 65 for a plurality of flights that will pass over or near a geographical fix assigned to the enroute list. The enroute list 60 is displayed in the proximity of a displayed geographic fix symbol 301 that represents the geographical fix assigned to the enroute list 60. A leader line 303 extends from the geographical fix symbol 301 to the enroute list 60, and is connected, for example, to the center of the geographical fix symbol 301 at one end and to the nearest corner on the enroute list at the other end.

Each enroute record includes the following fields:

(1) A Hold indicator field 71 that displays a hold symbol, shown for example as a "stop sign", that indicates that the flight is holding. The hold symbol is displayed pursuant to entry of a hold clearance in a Hold dialog box that is opened from the Flight pull down menu. Initially, the hold symbol is a predetermined color indicating a pre-planned clearance. After the hold clearance is issued, user selection of the Hold indicator field 71 causes the hold symbol to be displayed in a different color to indicate that a hold clearance has been issued.

(2) An Aircraft Identification field 72 which contains an alphanumeric identifier or call sign for the flight identified by the enroute record. The Aircraft Identification field is selected by the user to identify or "hook" the flight for subsequent operations regarding the enroute record or flight plan associated with the flight represented by the enroute record.

(3) A Heavy Jet field 73 that displays a heavy jet indicator H when the aircraft associated with the enroute record is a heavy jet. The type of aircraft can be displayed for a short time period such as three seconds by user selection of the heavy jet indicator H.

(4) A Predicted Altitude field 74 that displays the predicted altitude of the flight over the geographical fix identified in the enroute record. User selection of the Predicted Altitude field causes the current assigned altitude is displayed for a short time such as three seconds. If the flight is holding, the Predicted Altitude field displays the holding altitude.

(5) An Altitude/Radio Contact checkbox field 75 for displaying a checkbox. The Altitude/Radio Contact checkbox field is selected by the user to change the checkbox to a blue check mark when the controller verifies radio contact and altitude for the flight.

(6) An Estimated Time Over Fix field 76 which displays an estimated time that the flight will pass over the geographical fix contained in the enroute flight record. The Estimated Time Over Fix field is selected by the user to open a dialog box for entry of a position report (e.g., time at which a geographic fix is crossed). The estimated time displayed in the Estimated Time Over Fix field is highlighted in yellow if the flight is out of longitudinal conformance with the flight plan. If the flight is holding, the Estimated Time Over Fix field displays the Expect Further Clearance (EFC) time (i.e., the time of day when the flight can expect further clearance) and is displayed in cyan. If the EFC time expires, the displayed EFC time blinks in white.

(7) A Posting Fix field 77 which contains an alphanumeric identifier for the geographic fix assigned to the enroute list. The posting fix can comprises the location of a radio navigation aid that is represented by an alphabetic identifier or a location defined relative to a radio navigation aid, such as a Fix Radial Distance wherein SXC129025 means 025 nautical miles on the 129 degree radial of the SXC radio navigation aid. The Posting Fix field is selected by the user to enter an Enroute Clearance using a Full Flight dialog box. If the flight is holding, the Posting Fix Field 77 displays the hold fix in cyan.

(8) A Strategic Planning Indicators field 78 which contains an insertion symbol, shown in the form of an open scissors, displayed in red for example, if there exists an un-issued route insertion. The Strategic Planning Indicators field 78 is also used to display an enroute clearance check box pursuant to entry of an Enroute Clearance via the Full Flight dialog box. When an enroute clearance is issued to a pilot after it has been entered, the controller selects the Strategic Planning Indicators field 78 for the corresponding flight, and a blue check mark is displayed in place of the enroute clearance check box.

(9) A Direction Indicator field 79 which contains a direction symbol that represents the overall direction of flight.

(10) An Expand pushbutton 80. User selection of the Expand pushbutton causes display of a truncated route of flight and a Full Route Readout pushbutton 81 on a second and subsequent lines below the enroute record, as shown for flight RATS64 in the enroute list of FIG. 3. The truncated route includes only the fixes pertinent to the portion of the flight being handled by the controller, and the truncated portion is indicated by a truncation symbol "./.". Selection of the Full Route Readout pushbutton 81 causes the truncated part of the route to be displayed so that a full route readout is displayed with all of the fixes of the full route. In the truncated route readout and in the full route readout, a route insertion, which would be provided by the air traffic control system, is displayed in a different color from the route display together with a checkbox that is user selected to indicate that the route insertion has been issued to the pertinent aircraft. Typically, a route insertion would be provided to the sector that is upstream of the sector that is affected by the route insertion.

The Menu bar 63 includes an Undo pull-down menu 64 which is selected to undo specific operations, a Display pull-down menu 66 which is selected to perform display related functions such as sort by selected information such as estimated time over fix, and a Flight pull-down menu 68 which causes display of a flight pull-down menu containing predetermined options that can be individually selected to display a dialog box for the selected option. In accordance with known graphical user interface techniques, a dialog box provides a general mechanism for the user to enter a system command, as discussed previously. Examples of dialog boxes include a Hold dialog, a Full Flight dialog, a Cancel Dialog, an Assigned altitude dialog, a Flight Data Request dialog, a Controller Estimate Dialog, a Suspend dialog, an SSR Code dialog, and an Emergency dialog.

The Menu bar also includes an altimeter field 321 which displays the current altimeter setting for the posting fix with which the enroute list is associated. User selection of the altimeter field causes a current weather report to be displayed above the enroute list, for example in the same manner as illustrated with respect to the arrival list of FIG. 4.

Figure 4:
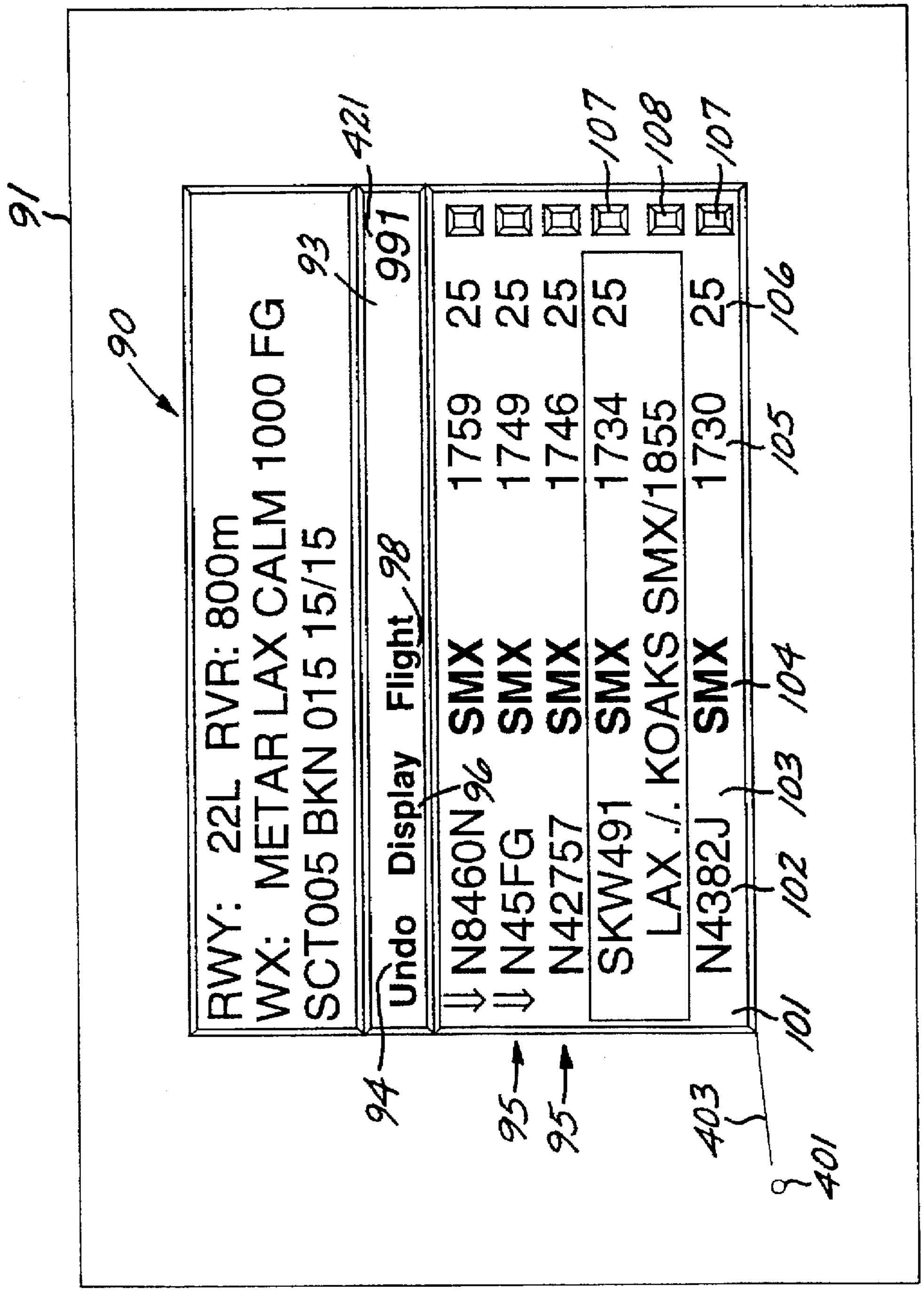
FIG. 4 is a schematic illustration of an arrival list that is displayed in accordance with the invention.

Referring now to FIG. 4, schematically set forth therein is an arrival list 90 in accordance with the invention which is displayed in a raster image 91 on the video display 11. The arrival list includes a menu bar 93 and arrival records 95 for a plurality of flights that are arriving at an airport assigned to the list. The arrival list 90 is displayed in the proximity of a displayed symbol 401 that represents the airport at which the flights on the arrival list will be arriving. A leader line 403 extends from the airport symbol 401 to the arrival list 90, and is connected, for example, to the center of the airport symbol 401 at one end and to the nearest corner on the arrival list 90 at the ether end.

Each arrival record includes the following fields:

(1) An Approach Clearance indicator field 101 in which an approach clearance checkbox □ is displayed pursuant to entry of an approach clearance for the flight identified by the arrival record to indicate that an arrival clearance has been entered for the flight identified by the arrival record and is waiting to be issued. An approach clearance is entered as described further herein by selection of an Arrival route field of an arrival record. When an approach clearance is issued (i.e., communicated) to a pilot after it has been entered, the controller selects the Approach Clearance indicator field 101 for the corresponding flight, and an Approach Clearance indicator ↓ is displayed in place of the approach clearance check box.

(2) An Aircraft Identification field 102 which contains an alphanumeric identifier or call sign for the flight identified by the departure record. The Aircraft Identification field is selected by the user to identify or "hook" the flight for subsequent operations regarding the arrival record or flight plan associated with the flight represented by the arrival record.

(3) A Heavy Jet indicator field 103 that displays a heavy jet indicator H when the aircraft associated with the arrival record is a heavy jet. The type of aircraft can be displayed for a short time period such as three seconds by user selection of the heavy jet indicator H.

(4) An Arrival Route field 104 that contains an identification of the last leg of the arrival route to be followed by the flight, or the Standard Instrument Arrival Route (STAR) or Preferential Arrival Route (PAR) that is to be followed by the flight. User selection of the Arrival Route field 104 causes a Full Flight dialog box to be displayed which is used to enter approach clearance information.

(5) An Estimated Time At Last Fix field 105 that contains an estimated tithe last he flight will pass the last geographical fix. If the flight is in a hold, the Estimated Time At Last Fix contains the Estimated Further Clearance time displayed in cyan.

(6) An Assigned Runway field 106 which contains an assigned runway for arrival. The assigned runway is changed by user selection of the Assigned Runway field.

(7) An Expand pushbutton 107. User selection of the Expand pushbutton displays a truncated route of flight and a Full Route Readout pushbutton 108 on a second and subsequent lines below the enroute record, as shown for flight SKW491 in FIG. 4. User selection of the Full Route Readout pushbutton 81 causes the truncated part of the route to be displayed so that a full route readout is displayed with all of the fixes of the full route. In the truncated route readout and in the full route readout, a route insertion, which would be provided by the air traffic control system, would be displayed in a different color from the route display.

The Menu bar 93 includes an Undo pull-down menu 94 which is selected to undo specific operations, a Display pull-down menu 96 which is selected to perform display related functions such as sort by selected information such as cleared state and/or estimated time of departure, and a Flight pull-down menu 98 which causes display of a flight menu containing predetermined options that can be individually selected to display a dialog box for the selected option. In accordance with known graphical user interface techniques, a dialog box provides a general mechanism for a user to enter a system command, as discussed previously. Examples of dialog boxes include a Hold dialog, a Full Flight dialog, a Cancel dialog, an Emergency dialog, an SSR Code dialog, a Request Flight dialog, a Suspend dialog, and an Arrival dialog.

The Menu bar also includes an altimeter field 421 which displays the current altimeter setting for the airport with which the arrival list is associated. User selection of the altimeter field causes a current weather report 423 to be displayed above the arrival list as shown in FIG. 4.

Figure 6:
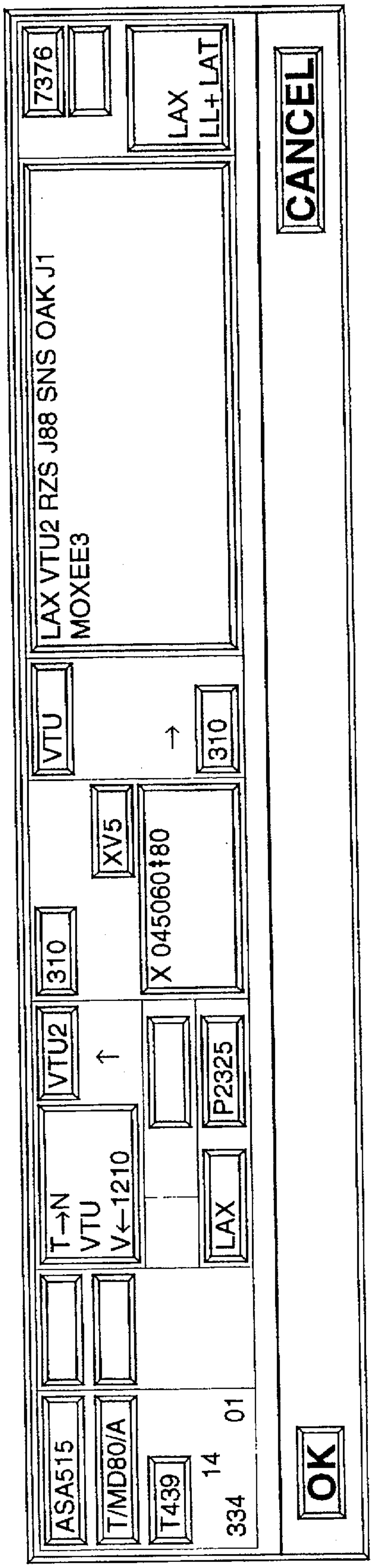
FIG. 6 is a schematic illustration of a full flight dialog box that is displayed by appropriate selection of an item from the lists of FIGS. 2, 3 or 4.

Referring now to FIG. 6, schematically depicted therein is a Full Flight dialog box that is displayed pursuant to user selection of the Expand pushbutton in the departure list, the Flight Menu or the posting fix field in the enroute list, or the Flight Menu in the arrival list. The Full Flight dialog box contains the same information as a conventional paper flight strip that has been utilized for many years in air traffic control, and provides a controller full edit access to the flight data for the selected flight, as well as all annotations pertinent to the selected flight. Completion of changes in the Full Flight dialog box results in the automatic display of annotations in the associated flight list record.

The foregoing has been a disclosure of an interactive display methodology that geographically presents flight data and advantageously provides for direct controller interaction with the displayed flight data and further advantageously enables annotations on the displayed flight data. The displayed flight data is advantageously presented in an integrated fashion with surveillance data so as to provide a comprehensive picture of the air situation in one localized area.

Although the foregoing has been a description and illustration of specific embodiments of the invention, various modifications and changes thereto can be made by persons skilled in the art without departing from the scope and spirit of the invention as defined by the following claims.

What is claimed is:

1. In an air traffic control system including a processor, memory apparatus, and a display device, a method for displaying departure flight data, comprising the steps of:

displaying in the proximity of a symbol representing a predetermined geographical fix a departure list containing selected information regarding a plurality of flights associated with the predetermined geographical fix, the list including a menu bar, and as to each flight a record including a departure clearance indicator field, an estimated time of departure field, an aircraft identification field, a departure route field, an assigned altitude field, an assigned runway field, and an expand button;

hooking a flight pursuant to user selection of a displayed aircraft identification field;

changing flight information as to the hooked flight pursuant to user activation of the menu bar;

displaying a full flight dialog box pursuant to user selection of an expand button;

selecting an assigned altitude field pursuant to user selection of a displayed assigned altitude field;

changing the contents of the selected assigned altitude field in accordance with user supplied information;

selecting an assigned runway field pursuant to user selection of a displayed assigned runway field; and changing the contents of the selected assigned runway field in accordance with user supplied information.

2. The method of claim 1 further including the step of displaying a check box in a departure clearance indicator field pursuant to user entry of a departure clearance into the air traffic control system.

3. The method of claim 1 further including the step of displaying a departure clearance indicator in a departure clearance indicator field pursuant to user selection of the departure clearance indicator field.

4. The method of claim 1 further including the step of displaying in an estimated time of departure field an estimated time of departure in a manner that indicates the presence of a clearance void time.

5. The method of claim 1 further including the step of displaying in an estimated time of departure field an estimated time of departure in a manner that indicates a clearance void time has expired.

6. The method of claim 1 further including the step of displaying a clearance void time pursuant to user selection of a displayed estimated departure time field.

7. In an air traffic control system including a processor, memory apparatus, and a display device, a method for displaying arrival flight data, comprising the steps of:

displaying in the proximity of a displayed symbol representing a predetermined geographical fix an arrival list containing selected information regarding a plurality of flights associated with the predetermined geographical fix, the list including a menu bar, and as to each flight a record including an arrival clearance indicator field, an aircraft identification field, an arrival route field, an estimated time at last fix field, an assigned runway field, and an expand button;

hooking a flight pursuant to user selection of a displayed aircraft identification field;

changing flight information as to the hooked flight pursuant to user activation of the menu bar;

displaying a hold fix in an arrival route field if the associated flight is holding;

displaying an expect further clearance time in an estimated time at last fix field if the associated flight is holding;

selecting an assigned runway field pursuant to user selection of a displayed assigned altitude field;

changing the contents of the selected assigned runway field in accordance with user supplied information; and displaying route information for a flight pursuant to user selection of an expand button.

8. The method of claim 7 further including the step of displaying a check box in an approach clearance indicator field pursuant to user entry of an approach clearance into the air traffic control system.

9. The method of claim 7 further including the step of displaying an approach clearance indicator in an approach clearance indicator field pursuant to user selection of the approach clearance indicator field.

10. The method of claim 7 further including the step of displaying a full flight dialog pursuant to user selection of an arrival route field.

* * * * *